United States Patent
Moldovan (10) Patent No.: US 9,994,305 B1
(45) Date of Patent: Jun. 12, 2018

(54) COAXIAL DRIVE PROPULSION SYSTEM FOR AERIAL VEHICLES, AND ASSOCIATED SYSTEMS AND METHODS

(71) Applicant: SWIFT ENGINEERING, INC., San Clemente, CA (US)

(72) Inventor: Matthew Moldovan, Carlsbad, CA (US)

(73) Assignee: SWIFT ENGINEERING, INC., San Clemente, CA (US)

( * ) Notice: Subject to any disclaimer, the term of this patent is extended or adjusted under 35 U.S.C. 154(b) by 0 days. days.

(21) Appl. No.: 15/488,413

(22) Filed: Apr. 14, 2017

(51) Int. Cl.
| | |
|---|---|
| *B64G 1/52* | (2006.01) |
| *B64C 15/14* | (2006.01) |
| *B64C 29/00* | (2006.01) |
| *B64C 11/46* | (2006.01) |
| *B64C 11/48* | (2006.01) |

(52) U.S. Cl.
CPC .............. *B64C 15/14* (2013.01); *B64C 11/46* (2013.01); *B64C 11/48* (2013.01); *B64C 29/0016* (2013.01); *F05D 2220/328* (2013.01)

(58) Field of Classification Search
CPC ......... B64C 15/14; B64C 11/46; B64C 11/48; B64C 29/0016; F05D 2220/328
See application file for complete search history.

(56) References Cited

U.S. PATENT DOCUMENTS 2,365,214 A * 12/1944 Reissner ............... B64C 11/343
 416/128
2,429,061 A * 10/1947 Hunter .................... B64D 15/12
 244/134 D
2,455,239 A * 11/1948 Doussain .............. B64C 11/306
 416/127

(Continued)

FOREIGN PATENT DOCUMENTS

WO 2015/073084 A1 5/2015

OTHER PUBLICATIONS

Esprit Tech, "Aeronaut CAM Folding Propellers (Rudi Freudenthaler)", http://www.espritmodel.com/aeronaut-cam-folding-propellers-fudi-freudenthaler.aspx, exact publication date unknown (web page last visited Apr. 13, 2017).

(Continued)

*Primary Examiner* — Assres H Woldemaryam
(74) *Attorney, Agent, or Firm* — Perkins Coie LLP (57) ABSTRACT

A propulsion system for an aircraft may include two coaxial propellers to operate in two different flight conditions. Each propeller may be attached to a driveshaft via corresponding one-way devices that allow each propeller to be driven in one direction but spin freely in the other direction. A reversible motor may selectively rotate the driveshaft in one direction to cause one propeller to operate while the other spins freely. For example, one propeller may be operated for one flight condition (such as vertical lift) and the other propeller may be operated for another flight condition (such as horizontal flight). Another propulsion system may include a propeller, a one-way bearing, a motor, and a generator. The one-way bearing may allow the motor to drive the propeller in one direction and to spin freely in the other direction to drive the generator with incoming airflow during a gliding phase of flight.

9 Claims, 5 Drawing Sheets

(56) References Cited

U.S. PATENT DOCUMENTS

| | | | | |
|---|---|---|---|---|
| 2,826,255 | A | * | 3/1958 | Peterson ................ B64C 11/46 188/110 |
| 8,506,437 | B2 | | 8/2013 | Cheung et al. |
| 8,641,463 | B2 | * | 2/2014 | Shuto ...................... B63H 5/10 440/80 |
| 9,527,588 | B1 | * | 12/2016 | Rollefstad ............. B64C 39/024 |
| 9,567,088 | B2 | | 2/2017 | Godlasky et al. |
| 2002/0086595 | A1 | * | 7/2002 | Jordan .................. B63H 23/06 440/75 |
| 2008/0089786 | A1 | * | 4/2008 | Sinreich .................. B63H 5/10 416/129 |
| 2010/0096234 | A1 | * | 4/2010 | Liang .................... F16D 41/066 192/45.018 |
| 2011/0014046 | A1 | * | 1/2011 | Gallet ...................... F02C 7/36 416/1 |
| 2013/0039764 | A1 | * | 2/2013 | Perkinson ............ B64C 11/306 416/129 |
| 2017/0174337 | A1 | * | 6/2017 | Roberts .................. B64C 27/14 |
| 2017/0190435 | A1 | * | 7/2017 | Kobayashi ............ B64D 27/24 |

OTHER PUBLICATIONS

Esprit Tech, "Aeronaut 2-Blade Black Spinners for Folding Propellers", http://www.espritmodel.com/aeronaut-black-spinners-for-folding-propellers.aspx, exact publication date unknown (web page last visited Apr. 13, 2017).

Esprit Tech, "Aeronaut Yoke for Turbo and Black 2-Blade Spinners", http://www.espritmodel.com/aeronaut-yoke-for-turbo-and-black-spinners.aspx, exact publication date unknown (web page last visited Apr. 13, 2017).

* cited by examiner

COAXIAL DRIVE PROPULSION SYSTEM FOR AERIAL VEHICLES, AND ASSOCIATED SYSTEMS AND METHODS

BACKGROUND

Many aircraft designs are optimized for one specific flight mode, while those designs may have reduced efficiency in other flight modes or conditions. For example, some aircraft are more efficient at lower speeds than at higher speeds, and some aircraft are more efficient at higher altitudes than at lower altitudes.

In one example, motors and propellers are commonly tuned to match the specific performance required for a given flight condition, and deviation from such tuning or from the intended flight condition often results in a reduction in efficiency. For example, in a vertical take-off and landing aircraft (such as a tailsitter aircraft), a high-power motor and propeller may be used to provide vertical lift, while that same high-power motor and propeller may be inefficient during horizontal cruise operations. Conversely, a low-power motor and propeller may be efficient for horizontal cruise operations, while that same low-power motor and propeller may not provide sufficient thrust for vertical lift. Accordingly, an aircraft running one type of propeller for both vertical lift and horizontal cruise may be inefficient in either or both flight conditions. Similarly, an aircraft in horizontal cruise may have a propeller and motor system that is efficient in one horizontal flight condition but not in other horizontal flight conditions.

Some aircraft may include two different propulsion systems, such as one for lift and one for horizontal thrust, or one for low-speed horizontal cruise and one for high-speed horizontal cruise. But one of these propulsion systems would generally be unused while the other was operating, such that the aircraft would effectively be carrying unnecessary weight.

SUMMARY

A propulsion system for an aircraft, such as a vertical take-off and landing aircraft, may be used to operate the aircraft in two different flight conditions. The propulsion system may include a driveshaft; a first propeller attached to the driveshaft via a first one-way bearing configured to allow rotation in a first direction and resist rotation in a second direction opposite the first direction; and a second propeller attached to the driveshaft via a second one-way bearing configured to allow rotation in the second direction and resist rotation in the first direction. The propulsion system may further include a propulsion motor configured to rotate the driveshaft in the first direction and in the second direction. In one embodiment, the first propeller can provide thrust in a vertical direction (for example, during take-off, landing, or hovering) and the second propeller can provide thrust in a horizontal direction (for example, during horizontal cruise). In another embodiment, the first propeller can provide thrust in a horizontal direction for horizontal cruise in a first flight condition (such as low-speed cruise), and the second propeller can provide thrust in a horizontal direction for horizontal cruise in a second flight condition (such as high-speed cruise).

Another propulsion system for an aircraft may include a driveshaft, a propeller attached to the driveshaft, a propulsion motor to rotate the driveshaft, and a one-way bearing connected to the driveshaft to allow the propulsion motor to rotate the propeller in a first direction and to allow the propeller to rotate freely relative to the motor in a second direction opposite the first direction. The propulsion system may include a generator connected to the driveshaft to generate electricity when the propeller rotates in the second direction.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

The present technology is directed to coaxial drive propulsion systems for aerial vehicles, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions, such as structures or functions common to aircraft, unmanned aerial vehicles (UAVs), motors, engines, or generators, may not be shown or described in detail so as to avoid unnecessarily obscuring the relevant description of the various embodiments. Accordingly, embodiments of the present technology may include additional elements or exclude some of the elements described below with reference to FIGS. 1-5, which illustrate examples of the technology.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Specific details of several embodiments of the present technology are described herein with reference to aircraft. Such aircraft may include manned or unmanned aircraft, such as UAVs or drones. In other embodiments, the technology may be used in other vehicles or machines. For example, embodiments of the technology may be used in conjunction with machines that provide thrust in water or other fluids.

Figure 1:
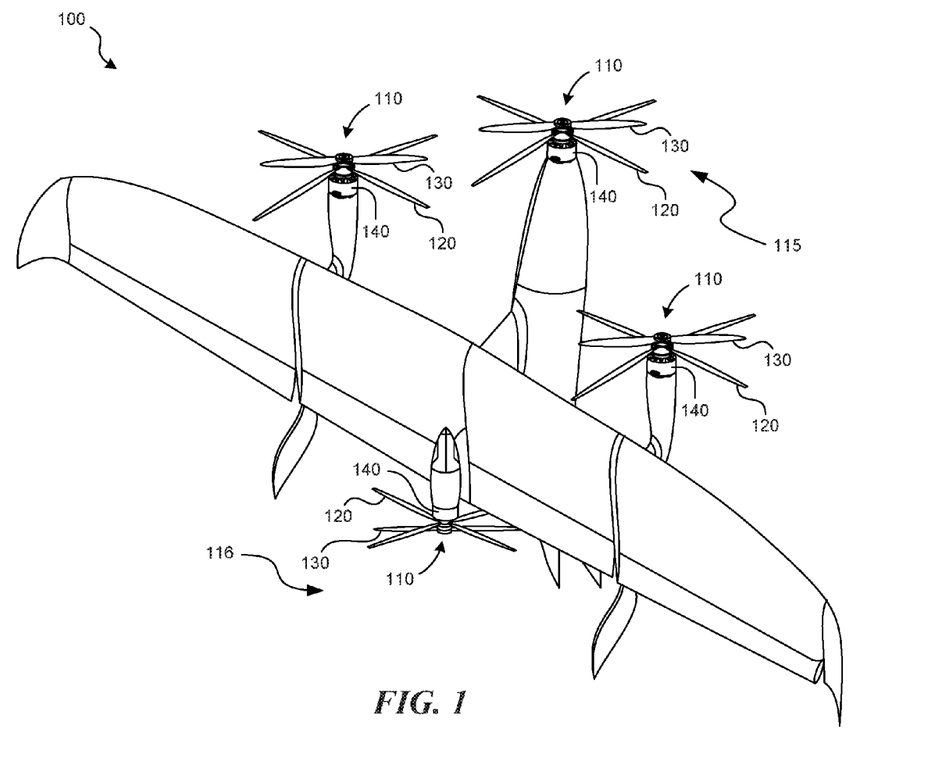
FIG. 1 illustrates a perspective view of a vertical take-off and landing aircraft with a plurality of coaxial drive propulsion systems in accordance with an embodiment of the present technology.

Turning now to the drawings, FIG. 1 illustrates an aircraft 100 having a plurality of coaxial drive propulsion systems 110 in accordance with an embodiment of the present technology. The aircraft 100 may be a vertical take-off and landing (VTOL) vehicle in which the aircraft 100 can take off or land in a substantially vertical orientation in which the nose portion 115 is above the tail portion 116 (a nose-up and tail-down orientation). The aircraft 100 may further be configured to fly in a generally horizontal orientation in which the nose portion 115 leads the tail portion 116 along a generally horizontal flight path, such as in horizontal cruise flight. The aircraft 100 may transition between a substantially vertical flight path or orientation and a substantially horizontal flight path or orientation in a manner similar to the aircraft described in U.S. Pat. No. 9,567,088, which is incorporated herein in its entirety by reference.

The coaxial drive propulsion systems 110 operate to provide thrust for vertical lift for the aircraft 100 (for example, when the aircraft 100 is in a vertical, nose-up and tail-down orientation), and to provide horizontal thrust for horizontal flight of the aircraft 100 (for example, in horizontal, nose-first cruise). Although the term "vertical" is used herein, "vertical" is not limited to a single precise vertical orientation. Rather, vertical orientations include substantially vertical orientations found in nose-up and tail-down flight and in transition to and from nose-up and tail-down flight. Likewise, although the term "horizontal" is used herein, "horizontal" is not limited to a single precise horizontal orientation. Rather, horizontal orientations include substantially horizontal orientations found in horizontal nose-first cruising flight and in transition to and from horizontal nose-first cruising flight.

In a particular embodiment of the present technology, in each of the coaxial drive propulsion systems 110, a first propeller 120 operates during portions of flight to provide vertical lift, while a second propeller 130 spins freely or otherwise does not operate. Conversely, during portions of flight in which horizontal thrust is needed, the second propeller 130 operates while the first propeller 120 spins freely or otherwise does not operate. A propulsion motor 140 associated with each coaxial drive propulsion system 110 may selectively operate the first propeller 120 or the second propeller 130 depending on the direction of rotation of the motor 140, using one-way bearings or one-way clutches, as will be described in additional detail below. In some embodiments, the first propeller 120 may be configured to have higher thrust than the second propeller 130 at the same rate of rotation. Although the aircraft 100 is illustrated as having four coaxial drive propulsion systems 110, any suitable number of coaxial drive propulsion systems 110 may be used. Moreover, although FIG. 1 illustrates a particular representative example of a VTOL vehicle, coaxial drive propulsion systems 110 according to various embodiments of the present technology may be used in any suitable VTOL vehicle. Accordingly, the aircraft 100 in FIG. 1 is provided as a non-limiting example of a VTOL vehicle that may implement one or more of the coaxial drive propulsion systems 110, to help provide context for the present technology.

Figure 2:
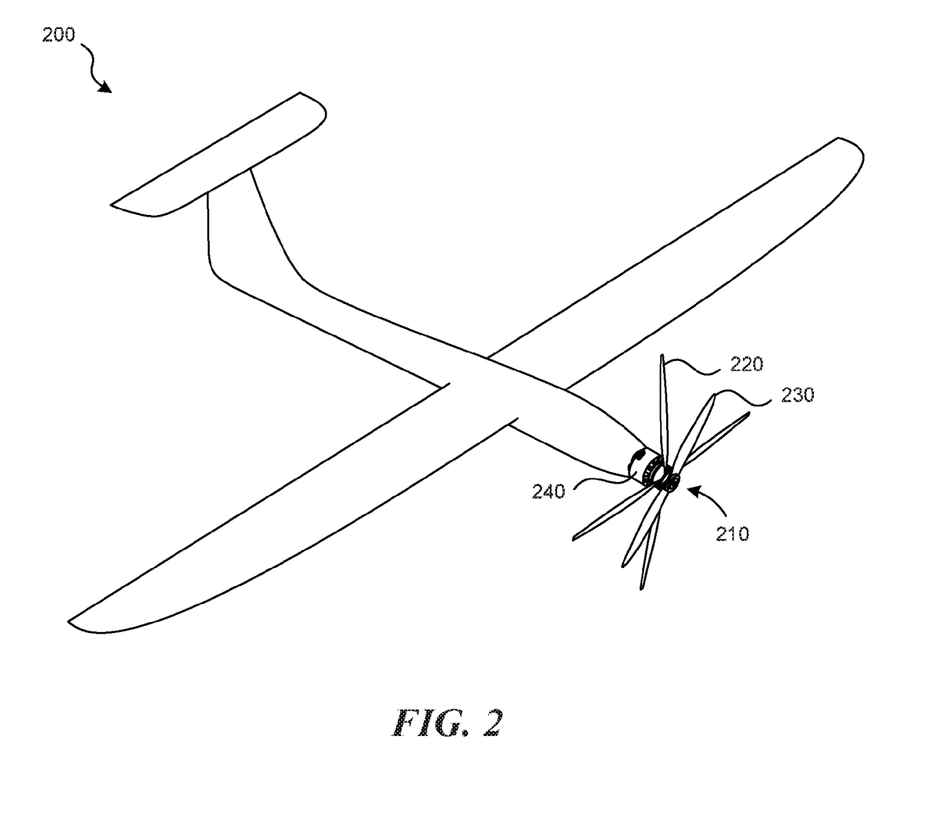
FIG. 2 illustrates a perspective view of a horizontal take-off and landing fixed-wing aircraft in accordance with another embodiment of the present technology.

FIG. 2 illustrates a horizontal take-off and landing fixed-wing aircraft 200 in accordance with another embodiment of the present technology. A coaxial drive propulsion system 210 may provide horizontal thrust for the aircraft 200. The coaxial drive propulsion system 210 may include a first propeller 220 configured for a first flight condition (for example, low-speed horizontal cruise), and a second propeller 230 configured for a second flight condition (for example, high-speed horizontal cruise). A propulsion motor 240 may output rotation in a first direction to cause the first propeller 220 to operate in the first flight condition, while the second propeller 230 spins freely or otherwise is not in operation. In the second flight condition, the propulsion motor 240 may output rotation in a second direction opposite the first direction to cause the second propeller 230 to provide thrust, while the first propeller 220 spins freely or otherwise is not in operation.

Although the aircraft 200 in FIG. 2 is illustrated as having one coaxial drive propulsion system 210, any suitable number of coaxial drive propulsion systems 210 may be used. Moreover, although FIG. 2 illustrates a particular representative example of an aircraft, the present technology may be used in any suitable aircraft, such as a biplane, a flying wing, or other aircraft. Accordingly, the aircraft 200 in FIG. 2 is provided as a non-limiting example of a fixed-wing aircraft that may use one or more of the coaxial drive propulsion systems 210, to help provide context for the present technology. According to various embodiments, the present technology generally provides a system for using at least two different propellers with the same propulsion motor.

Figure 3:
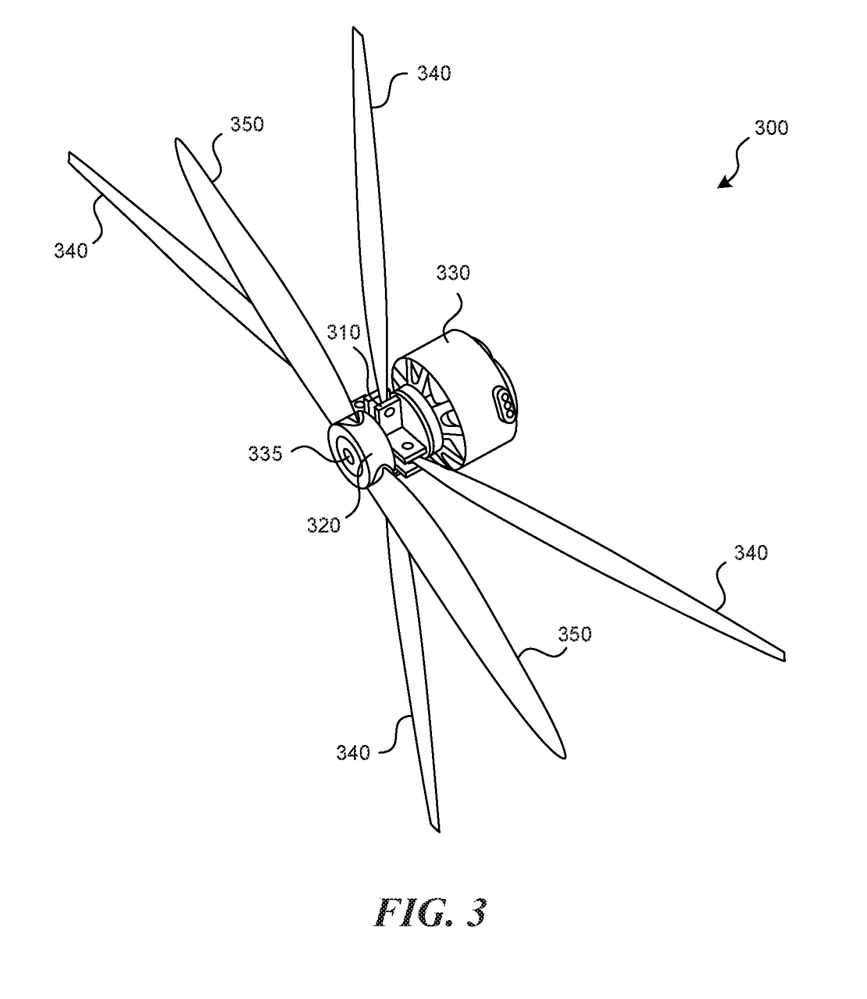
FIG. 3 illustrates a perspective view of a coaxial drive propulsion system in accordance with an embodiment of the present technology.

FIG. 3 illustrates a perspective view of a coaxial drive propulsion system 300 in accordance with an embodiment of the present technology. The coaxial drive propulsion system 300 may include a first propeller 310 and a second propeller 320. Each propeller 310, 320 is connected to the same propulsion motor 330 via a driveshaft 335. Each propeller 310, 320 may be connected to the driveshaft 335 with a one-way bearing, as illustrated and described below with respect to FIG. 4. The propulsion motor 330 may be an electric motor (such as a brushless DC motor), a gasoline motor, or any other motor suitable for providing rotation to the driveshaft 335 during flight operations. The propulsion motor 330 or its output may be reversible, such that it is capable of operating to output rotation in two opposing directions. Reversible motors of this nature are known to those of ordinary skill in the art.

As explained above, the first propeller 310 and the second propeller 320 may be designed to operate in different flight conditions and, accordingly, each propeller 310, 320 may have different characteristics. For example, the first propeller 310 may have four blades 340. Each blade 340 may optionally be tuned for providing thrust in a first flight condition, such as for vertical lift. The second propeller 320 may have two blades 350, for example. Each blade 350 may optionally be tuned for providing thrust in a second, different desired flight condition, such as for horizontal thrust.

In various embodiments of the technology, the propellers 310, 320 may each have between two and six blades, or another suitable number of blades. Each propeller 310, 320 may have the same number of blades or different numbers of blades. The blades 340, 350 may each have a pitch angle or angle of attack suitable for providing the desired thrust. A pitch angle of a blade 340 of the first propeller 310 may be different from a pitch angle of a blade 350 of the second propeller 320. For example, in various embodiments, one or more of the blades 340, 350 may have a pitch angle between 4 degrees and 15 degrees. The propellers 310, 320 may have various diameters, and the first propeller 310 may have a different diameter than the second propeller 320. In a UAV, the propellers 310, 320 may have diameters between 7 inches and 20 inches, for example, or may have other suitable diameters.

Figure 4:
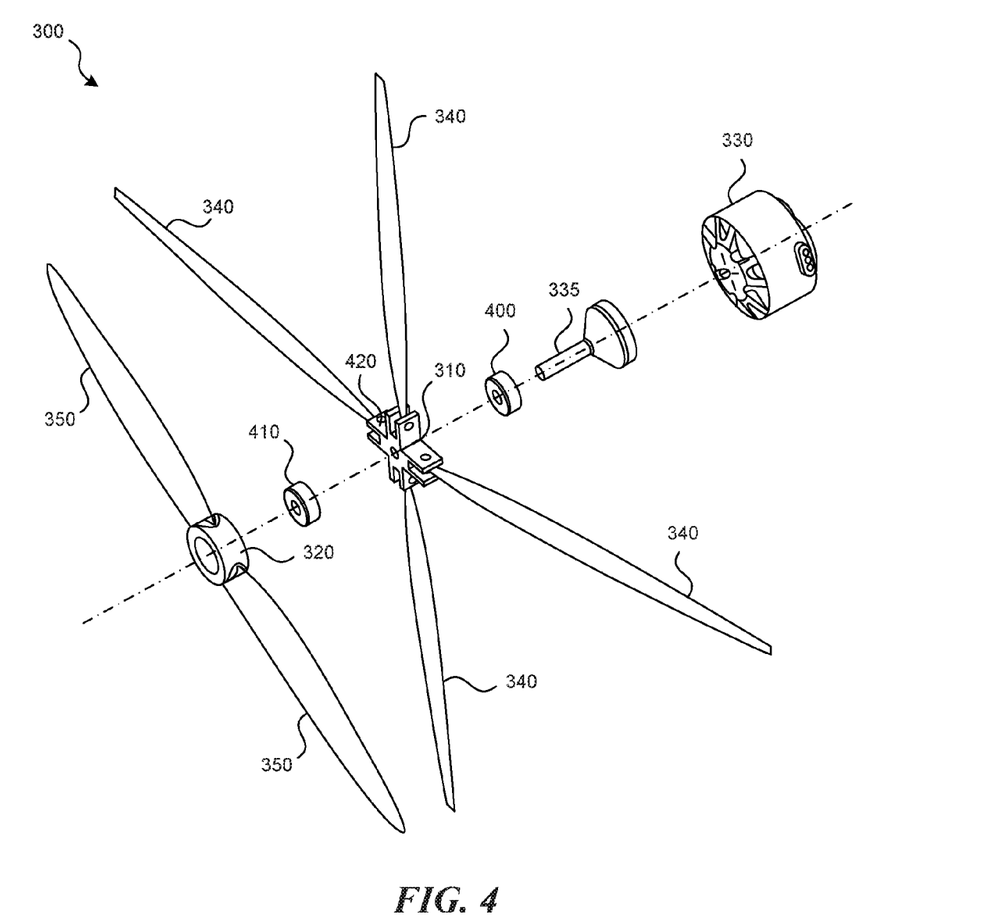
FIG. 4 illustrates an exploded view of the coaxial drive propulsion system shown in FIG. 3.

FIG. 4 illustrates an exploded view of the coaxial drive propulsion system 300 shown in FIG. 3. The first propeller 310 connects to the driveshaft 335 via a first one-way bearing 400. The second propeller 320 connects to the same driveshaft 335 via a second one-way bearing 410. The driveshaft 335 connects to the propulsion motor 330 to be driven by the propulsion motor 330 during flight operations.

The first one-way bearing 400 may be configured to allow relative rotation between the first propeller 310 and the driveshaft 335 in a first direction (for example, counterclockwise) but prevent such relative rotation in the second, opposite direction (for example, clockwise). The second one-way bearing 410 may be configured to allow relative rotation between the second propeller 320 and the driveshaft 335 in the second direction but prevent such relative rotation in the first direction (opposite the second). Accordingly, the motor 330 (or the driveshaft 335) may be configured to operate in one direction to cause one of the propellers 310, 320 to operate and provide thrust while the other of the propellers 310, 320 spins freely or is otherwise not operating. In other words, the motor 330 may operate the propellers 310, 320 independently of each other. Although the term "one-way bearing" is used herein, such a one-way device may be a free-wheel clutch, ratchet, or other suitable device for transmitting rotation in one direction but not another. One-way bearings, free-wheel clutches, ratchets, and such other suitable devices for transmitting rotation in one direction but not another are known to those of ordinary skill in the art. Accordingly, the term "one-way bearing" is understood to mean any suitable device for transmitting rotation in one direction but not another.

In some embodiments, the blades 340 of the first propeller 310 may be attached to a folding propeller hub 420. The folding propeller hub 420 allows the blades 340 to fold or pivot back toward a main body of the aircraft when they are not in use (for example, when they are able to spin freely and are not being driven by the propulsion motor 330). Folding propeller hubs are known to those of ordinary skill in the art.

The present technology allows an aircraft to use one motor with two coaxial propellers, each tuned to a particular thrust for improved efficiency in a flight condition. For example, as described above, one propeller can be tuned to provide thrust for vertical take-off or landing, while another propeller can be tuned for horizontal flight, such as horizontal cruising, take-off, or landing. Or, for example, as described above, one propeller can be tuned for a first horizontal cruise condition and another can be tuned for a second, different horizontal cruise condition. In a particular example, one propeller can be tuned for horizontal take-off or horizontal landing procedures and the other propeller can be tuned for horizontal cruise. Using one motor for two different flight conditions saves weight by reducing or preventing the need for two wholly separate propulsion motors. Using one motor for two different flight conditions may also simplify the number of parts (and therefore, the number of failure points) relative to other aircraft.

In some embodiments, the propulsion systems 110, 300 may further be tuned by adding a small gearbox or transmission, such as a planetary gear transmission, between one of the one-way bearings and the propulsion motor. The small gearbox or transmission may facilitate faster or slower propeller speed relative to the propulsion motor output speed. Accordingly, the transmission may facilitate further tuning of the propeller speed relative to the motor output speed to improve or optimize motor and propeller efficiency for a given flight condition.

Although two one-way devices (such as one-way bearings 400, 410) are illustrated and described with regard to FIG. 4, in some embodiments, a single one-way device may be used. For example, either one-way bearing 400, 410 may be omitted so that its corresponding propeller (310 or 320) may be rigidly fixed to the driveshaft 335. When the motor 330 operates in a first direction, both propellers may operate. When the motor 330 operates in a second direction opposite the first direction, only one propeller may operate (while the other propeller spins freely). In one non-limiting example, two propellers may operate to provide vertical lift when the motor operates in one direction, and when the motor reverses, one propeller may spin freely or its blades may fold away (for example, using a folding propeller hub 420 described above).

In another embodiment of the present technology, which is not illustrated, two propulsion motors may be used to facilitate operation of one propeller in one direction and another propeller in another direction. For example, a first motor may be tuned in conjunction with a first propeller for a first flight condition and a second motor may be tuned in conjunction with a second propeller for a second flight condition. The first motor may be connected to a common driveshaft using a first one-way bearing while the second motor is connected to the common driveshaft using a second one-way bearing. The first and second motors may output rotation in opposite directions and the propellers may be rigidly attached to the common driveshaft. The first motor may be turned on to operate the first propeller via the first one-way bearing while the common driveshaft spins freely relative to the second motor, which may be turned off. Likewise, the second motor may be turned on to operate the second propeller via the second one-way bearing while the common driveshaft spins freely relative to the first motor. The first or second one-way bearings may each be part of a transmission, such as a spur gear transmission, connecting each corresponding motor to the common driveshaft.

Figure 5:
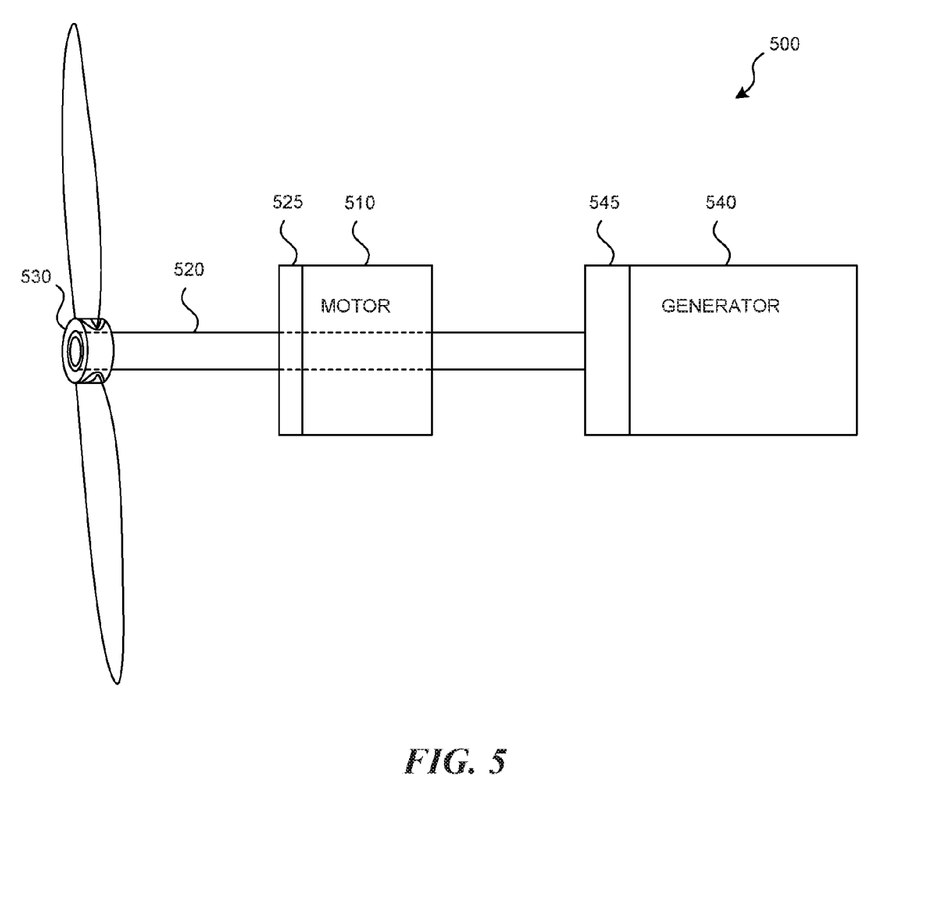
FIG. 5 illustrates a schematic view of a propulsion system in accordance with an embodiment of the present technology.

FIG. 5 illustrates a schematic view of a propulsion system 500 in accordance with another embodiment of the present technology. A propulsion motor 510 may rotate a driveshaft 520, which rotates a propeller 530 attached to the driveshaft 520 to provide thrust for an aircraft. The driveshaft 520 may also be connected to a generator 540.

In accordance with an embodiment of the technology, the driveshaft 520 connects to the propulsion motor 510 via a first one-way bearing 525, and the driveshaft 520 connects to the generator 540 via a second one-way bearing 545. The one-way bearings may 525, 545 may be part of the motor 510 and/or generator 540, or they may be separate components. In accordance with the technology, the propulsion motor 510 may rotate the driveshaft 520 in a first direction while the driveshaft 520 spins freely relative to the generator 540. When the propulsion motor 510 is not operating, for example, during a coasting or gliding phase of flight, the propeller 530 spins the driveshaft 520 in a second direction opposite the first direction (due to incoming airflow). In the second direction, the driveshaft 520 is free to rotate relative to the propulsion motor 510, but it drives the generator 540, which generates electricity to charge batteries or otherwise provide power. Although the description herein refers to one-way bearings, the one-way bearings 525, 545 may be any device or mechanism suitable for providing rotation in one direction but not the other, such as a free-wheel clutch or a ratchet.

In a representative embodiment, the propulsion motor 510 may be used to provide thrust during flight, but the motor 510 may be powered down during a glide phase, in which the propeller 530 may begin counter-rotating (due to incoming airflow) to drive the generator 540 via the driveshaft 520. Endurance gliders or high-altitude UAVs may implement this technology to increase their range.

From the foregoing, it will be appreciated that specific embodiments of the disclosed technology have been described for purposes of illustration, but that various modifications may be made without deviating from the technology, and elements of certain embodiments may be interchanged with those of other embodiments, and that some embodiments may omit some elements. For example, in various embodiments of the technology, the aircraft (such as an aircraft 100 or 200 described above with respect to FIGS. 1 and 2, or other aircraft) may be manned or unmanned; it may be autonomous, piloted, and/or remotely controlled; it may be a vertical take-off and/or landing aircraft; and/or it may be a standard aircraft.

Although propulsion motors (such as the propulsion motors 140, 330, and 510 described above) may be illustrated and described as being directly connected to the driveshaft (for example, 335 or 520), in some embodiments, other motors may output rotation through a belt drive, gears, or other forms of rotational transmissions to provide rotation to the driveshaft. In some embodiments, such transmissions may enable rotation of the driveshaft in opposing directions. In some embodiments, coaxial drive propulsion systems (such as 110, 210, and/or 300 described above) and/or propulsion systems with generators (such as 500 described above) may be used as pusher propulsion. In other embodiments, they may be used as puller or tractor propulsion. In some embodiments, the technology may be used in rotorcraft. In various embodiments, not every element is required and certain elements may be omitted or combined.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. A propulsion system for an aircraft, the propulsion system comprising:
   a driveshaft;
   a first propeller attached to the driveshaft via a first one-way bearing configured to allow rotation in a first direction and resist rotation in a second direction opposite the first direction; and
   a second propeller attached to the driveshaft via a second one-way bearing configured to allow rotation in the second direction and resist rotation in the first direction.

2. The propulsion system of claim 1, further comprising a propulsion motor configured to rotate the driveshaft in the first direction and in the second direction.

3. The propulsion system of claim 2 wherein the propulsion motor is an electric motor.

4. The propulsion system of claim 1 wherein at least one of the first propeller or the second propeller comprises a folding propeller hub.

5. The propulsion system of claim 1 wherein the first propeller is configured to provide thrust in a vertical direction and the second propeller is configured to provide thrust in a horizontal direction.

6. An aircraft comprising a propulsion system, the propulsion system comprising:
   a first one-way bearing attached to a driveshaft;
   a first propeller attached to the first one-way bearing;
   a second one-way bearing attached to the driveshaft;
   a second propeller attached to the second one-way bearing; and
   a propulsion motor carried by the aircraft and configured to rotate the driveshaft in a first direction and a second direction opposite the first direction.

7. The aircraft of claim 6 wherein the aircraft is a vertical take-off and landing aircraft, and wherein the first propeller is configured to provide more thrust at a rate of rotation than the second propeller at the rate of rotation.

8. The aircraft of claim 6 wherein the aircraft is a horizontal take-off and landing aircraft.

9. The aircraft of claim 6 wherein at least one of the first propeller or the second propeller comprises a folding propeller hub.

* * * * *